No. 790,363.

Patented May 23, 1905.

UNITED STATES PATENT OFFICE.

JOHN HAGENBACH, OF BASEL, SWITZERLAND, ASSIGNOR TO ANILIN COLOR AND EXTRACT WORKS FORMERLY JOHN R. GEIGY, OF BASEL, SWITZERLAND.

NITROAZO DYE AND PROCESS OF MAKING SAME.

SPECIFICATION forming part of Letters Patent No. 790,363, dated May 23, 1905.

Application filed October 21, 1904. Serial No. 229,416.

*To all whom it may concern:*

Be it known that I, JOHN HAGENBACH, doctor of philosophy, a citizen of the Swiss Republic, and a resident of Basel, Switzerland, have invented certain new and useful Improvements in Nitroazo Dyes and Processes of Making Same, of which the following is a specification.

The nitration of diazo bodies without decomposition has never been effectuated with success until now on account of their great changeableness. I have now found that the diazo body, which is obtained from the 1-amido-2-naphthol-4-sulfonic acid by diazotizing the latter in the presence of a neutral copper salt as is described in the specification for United States Letters Patent of T. Sandmeyer, Serial No. 226,619, filed September 30, 1904, and in the German application, No. A10,782 IV/12$^a$, dated March 4, 1904, can be nitrated without decomposition in the well-known manner, yielding a good crystallizing durable nitrodiazo compound, which when coupled with beta-naphthol gives a novel and very valuable nitro ortho oxy azo coloring-matter, dyeing wool from acid-bath dark reddish brown, which shade after subsequent treatment in the same bath with bichromate turns soot-black, distinguished for an extremely great fastness to the action of light and the processes of milling and potting. The facility with which the said diazo compound can be nitrated is probably based upon the character of the non-nitrated diazo body, which against all expectation and against all analogies is scarcely decomposable in its isolated and dry state. It can be dried without danger of explosion at a temperature of from 80° to 100° centigrade, and also in dry state it is not explosive. The reason for the exceptional behavior of this diazo body may be explained by the supposition of an anhyrid form of the latter, as Bamberger presumes in his publication (*Ber. d. D. Chem. Ges.*, XXVII, page 680) for the non-sulfonated diazo-naphthols, naming them "diazo oxid." The effect of the nitro group in the combination of this nitro diazo compound with beta-naphthol is a very surprising one in two directions, first, the nitro group multiplies the tinctorial character of the thus-obtained coloring-matter and deepens the shade; secondly, it increases the ability of combination of the diazo compound in a considerable degree.

The following examples are given to illustrate the method of carrying out my invention.

*Example 1—Production of nitro-1-diazo-2-naphthol-4-sulfonic acid.*—Twenty-five kilos of well-dried and powdered 1-diazo-2-naphthol-4-sulfonic acid are, while stirring, added gradually to seventy-five kilos of concentrated sulfuric acid. To this a well-cooled mixture of seven kilos of nitric acid (containing ninety-six per cent. real $HNO_3$) and fourteen kilos of monohydrate of sulfuric acid is allowed to run slowly while the temperature is kept between from 0° to 5° centigrade by exterior cooling. To accomplish the reaction, the stirring is still continued for some hours at the same temperature. Then the whole is poured upon one hundred kilos of ice, broken in small pieces. The nitro compound then separates immediately in the form of slightly-yellow crystals, which are filtered off. The still strongly-acid paste of the thus-obtained nitrodiazo body is employed directly for the manufacture of the azo dyestuff. It is self-evident that the above-described process of nitration of the diazo-naphthol sulfonic acid can be modified in different ways with regard to the exact proportions, the temperature, and other special conditions without alteration of the result. The nitro-1-diazo-2-naphthol-4-sulfonic acid or sulfonic acid of nitro-naphthalene-1-2-diazoöxid thus obtained dissolves very easily in water with a yellow color and can be precipitated from this solution by addition of moderately-diluted sulfuric acid or concentrated hydrochloric acid in fine slightly-yellow colored crystals.

*Example 2—Nitro-azo dye from nitro-1-diazo-2-naphthol-4-sulfonic acid.*—Fifteen kilos of beta-naphthol are dissolved in two hundred liters of water by addition of fourteen kilos of caustic-soda lye of 40° Baumé. Then are added fifty kilos of sodium carbonate dissolved in one hundred and fifty liters of water. To this solution is carried in the acid paste of the nitro-diazo compound, directly obtained by nitration of twenty-five kilos diazonaphtholsulfonic acid, according to the foregoing Example 1, in small portions, and the temperature kept at about 25° centigrade. The formation of the color begins almost instantaneously; but it is accomplished only after several hours and may be known by the absence of diazo compound in the solution when adding a small quantity of an alkaline solution of resorcin. The coloring-matter is precipitated in the ordinary manner by means of common salt, filtered off and dried.

The new nitro-azo dyestuff thus obtained is in the form of its sodium salt, when dry and pulverized a brownish black powder with metallic luster, easily soluble in water, with a dark blue in concentrated sulfuric acid with a violet-blue color. By addition of a mineral acid to the watery solution a reddish brown precipitate separates.

Having now described my invention, what I claim is—

1. The herein-described process for the manufacture of a new nitro-azo dyestuff, which consists in nitrating the naphthalene-1-2-diazo oxid-4-sulfonic acid, and combining the thus-obtained nitro-diazo compound with beta-naphthol, substantially as set forth.

2. The herein-described process for the production of nitro naphthalene-1-2-diazo oxid-4-sulfonic acid, which consists in nitrating the naphthalene-1-2-diazo oxid-4-sulfonic acid, substantially as set forth.

3. The new nitro-azo dyestuff produced by combining the nitro-naphthalene-1-2-diazo oxid-4-sulfonic acid with beta-naphthol, being in form of its sodium salt a brownish-black powder with metallic luster easily soluble in water with a dark-blue color, separating a reddish-brown precipitate on addition of a mineral acid, and dyeing a wool from acid-bath dark reddish brown, which shade by after treatment with bichromate changes into soot-black, extremely fast to light and the processes of milling and potting substantially as set forth.

In testimony whereof I have signed my name to this specification in the presence of two subscribing witnesses.

JOHN HAGENBACH.

Witnesses:
 GEO. GIFFORD,
 ALBERT GRASLER.